US012589458B2

(12) United States Patent
Ishikawa

(10) Patent No.: US 12,589,458 B2
(45) Date of Patent: Mar. 31, 2026

(54) MACHINE TOOL

(71) Applicant: FANUC CORPORATION, Yamanashi (JP)

(72) Inventor: Ryutaro Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 658 days.

(21) Appl. No.: 18/009,520

(22) PCT Filed: Jun. 24, 2021

(86) PCT No.: PCT/JP2021/023887
§ 371 (c)(1),
(2) Date: Dec. 9, 2022

(87) PCT Pub. No.: WO2022/004538
PCT Pub. Date: Jan. 6, 2022

(65) Prior Publication Data
US 2023/0241738 A1 Aug. 3, 2023

(30) Foreign Application Priority Data
Jun. 30, 2020 (JP) ................................. 2020-112684

(51) Int. Cl.
*B23Q 11/10* (2006.01)
*B23Q 17/00* (2006.01)

(52) U.S. Cl.
CPC .......... *B23Q 11/1015* (2013.01); *B23Q 17/00* (2013.01)

(58) Field of Classification Search
CPC ............................ B23Q 11/1015; B23Q 17/00
See application file for complete search history.

(56) References Cited

U.S. PATENT DOCUMENTS 3,554,081 A * 1/1971 Haley ........................ B23C 3/34
409/143
3,577,808 A * 5/1971 Visser ................ B23Q 11/1053
261/78.2
(Continued)

FOREIGN PATENT DOCUMENTS

CN 102448666 A 5/2012
CN 109702550 A 5/2019
(Continued)

OTHER PUBLICATIONS

International Search Report dated Aug. 31, 2021, in International Patent Application No. PCT/JP2021/023887 (5 pages).

*Primary Examiner* — Lucas E. A. Palmer
(74) *Attorney, Agent, or Firm* — Maier & Maier, PLLC

(57) ABSTRACT

A machine tool including a cutting fluid supply unit configured to supply a cutting fluid to be discharged from a leading end of a tool mounted on a spindle, a detection unit configured to detect information for determining arrival of the cutting fluid to the leading end of the tool, and a control unit configured to determine the arrival of the cutting fluid based on the information detected by the detection unit and control the cutting fluid supply unit, wherein the control unit is configured to set a supply speed of the cutting fluid after the cutting fluid supply unit starts to supply the cutting fluid until determination of the arrival of the cutting fluid to be higher than a supply speed after the determination.

3 Claims, 6 Drawing Sheets

(56) References Cited

U.S. PATENT DOCUMENTS

| | | | | |
|---|---|---|---|---|
| 3,741,071 A * | 6/1973 | Hoglund | ............... | B23Q 15/02 |
| | | | | 451/26 |
| 5,595,462 A * | 1/1997 | Hensley | .............. | B23Q 1/0036 |
| | | | | 408/1 R |
| 5,669,743 A * | 9/1997 | Johnson | ............. | B23Q 11/1023 |
| | | | | 408/56 |
| 5,951,216 A * | 9/1999 | Antoun | .............. | B23Q 11/1038 |
| | | | | 408/56 |
| 6,772,042 B1 * | 8/2004 | Warren | ............. | B23Q 11/1038 |
| | | | | 700/177 |
| 10,406,643 B2 * | 9/2019 | Li | .......................... | B23Q 11/10 |
| 11,951,578 B1 * | 4/2024 | Kuo | ....................... | B23Q 11/10 |
| 2008/0144693 A1 * | 6/2008 | Sato | ....................... | G01K 15/00 |
| | | | | 374/1 |
| 2015/0377663 A1 * | 12/2015 | Kulkarni | .............. | G01L 19/149 |
| | | | | 73/861.08 |
| 2016/0184951 A1 * | 6/2016 | Kurokawa | .............. | B25J 11/00 |
| | | | | 901/41 |

| | | | | |
|---|---|---|---|---|
| 2017/0087681 A1 * | 3/2017 | Matsuda | ............ | B23Q 11/0067 |
| 2018/0056465 A1 * | 3/2018 | Koshiishi | ........... | B23Q 11/1076 |
| 2019/0118323 A1 * | 4/2019 | Koshiishi | ........... | B23Q 11/1015 |
| 2019/0160618 A1 * | 5/2019 | Pereira Neto | ...... | B23Q 11/1053 |
| 2019/0163158 A1 * | 5/2019 | Takahara | .............. | G05B 19/18 |
| 2020/0368866 A1 * | 11/2020 | Tooyama | .............. | G05B 19/18 |
| 2022/0266350 A1 * | 8/2022 | Maeda | ............. | B23B 29/03471 |

FOREIGN PATENT DOCUMENTS

| | | | | |
|---|---|---|---|---|
| JP | 861109645 | A | | 5/1986 |
| JP | H08192316 | A * | | 7/1996 |
| JP | 2001334438 | A | | 12/2001 |
| JP | 2004306230 | A | | 11/2004 |
| JP | 2006212714 | A | | 8/2006 |
| JP | 2011104723 | A | | 6/2011 |
| JP | 2012106292 | A | | 6/2012 |
| JP | 2013220497 | A | | 10/2013 |
| KR | 1020140087807 | A | | 7/2014 |
| WO | 2013058004 | A | | 4/2013 |

* cited by examiner

MACHINE TOOL

TECHNICAL FIELD

This disclosure relates to a machine tool.

BACKGROUND

A machine tool that supplies a cutting fluid to a leading end of a tool through an inside of a center shaft of the tool has been hitherto known (e.g., see Japanese Unexamined Patent Application, Publication No. 2001-334438).

This machine tool stores such supply conditions for each tool beforehand that an amount of cutting fluid supplied during an initial operation time when processing work is started becomes larger than an amount of cutting fluid supplied during the subsequent steady operation time.

SUMMARY

An aspect of this disclosure is a machine tool including: a cutting fluid supply unit configured to supply a cutting fluid to be discharged from a leading end of a tool mounted on a spindle; a detection unit configured to detect information for determining arrival of the cutting fluid to the leading end of the tool; and a control unit configured to determine the arrival of the cutting fluid based on the information detected by the detection unit and control the cutting fluid supply unit, wherein the control unit is configured to set a supply speed of the cutting fluid after the cutting fluid supply unit starts to supply the cutting fluid until determination of the arrival of the cutting fluid to be higher than a supply speed after the determination.

DETAILED DESCRIPTION OF THE EMBODIMENTS

When supply conditions are stored for respective tools, and further when the supply conditions are stored for respective tools according to whether the tool is to be used for the first time or has already been used, the effort involved in the setting task increases as the number of tools to be used increases. Even in the case where the same tool is used, when the type of cutting fluid is changed or the temperature of the cutting fluid changes, the viscosity of the cutting fluid changes, so that the amount of cutting fluid supplied during the same time changes.

Therefore, it is desirable to reduce the effort involved in the task of setting the amount of cutting fluid to be supplied, and, moreover, to quickly supply an appropriate amount of cutting fluid even when conditions change.

An aspect of this disclosure is a machine tool including: a cutting fluid supply unit configured to supply a cutting fluid to be discharged from a leading end of a tool mounted on a spindle; a detection unit configured to detect information for determining arrival of the cutting fluid to the leading end of the tool; and a control unit configured to determine the arrival of the cutting fluid based on the information detected by the detection unit and control the cutting fluid supply unit, wherein the control unit is configured to set a supply speed of the cutting fluid after the cutting fluid supply unit starts to supply the cutting fluid until determination of the arrival of the cutting fluid to be higher than a supply speed after the determination.

A machine tool 1 according to an embodiment of this disclosure will be described below with reference to the drawings.

Figure 1:
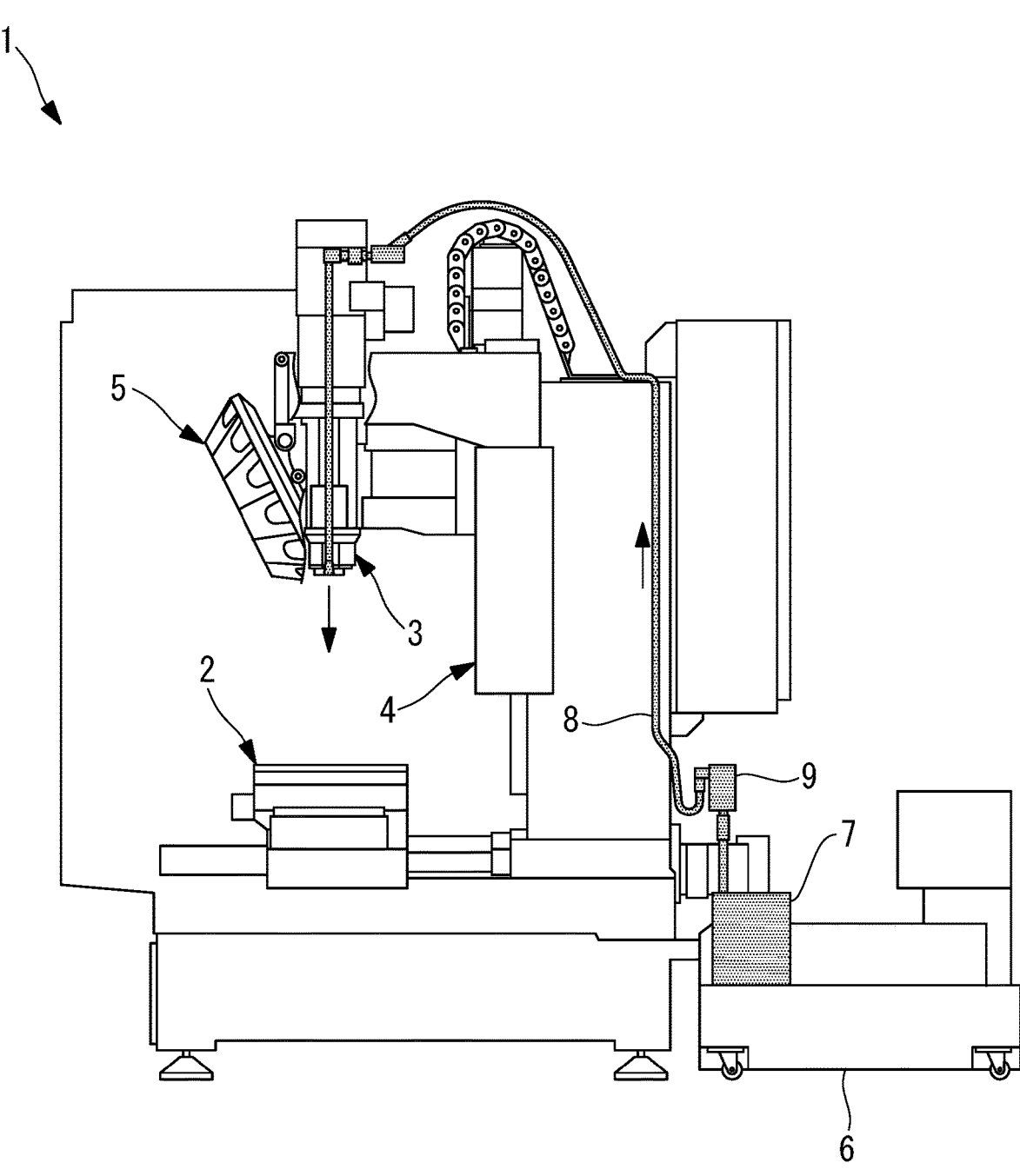
FIG. 1 is an overall configuration view showing a machine tool according to an embodiment of this disclosure.

As shown in FIG. 1, the machine tool 1 according to this embodiment includes a table 2 on which a workpiece is placed and moved in horizontal directions, a spindle 3 that detachably supports and rotates a tool S for processing the workpiece, a raising-lowering mechanism 4 that moves the spindle 3 in an up-down direction, and a turret 5 that supports a plurality of tools S in an exchangeable manner.

The machine tool 1 further includes a coolant tank 6 that stores a coolant (cutting fluid) L, a pump (cutting fluid supply unit) 7 that pumps up the coolant L inside the coolant tank 6, and a pipe (flow passage) 8 that connects the pump 7 and the spindle 3 to each other. In addition, the machine tool 1 includes a pressure sensor (detection unit) 9 that detects a pressure (information) inside the pipe 8, and a control unit 10 that controls the pump 7 based on the pressure detected by the pressure sensor 9.

Figure 2:
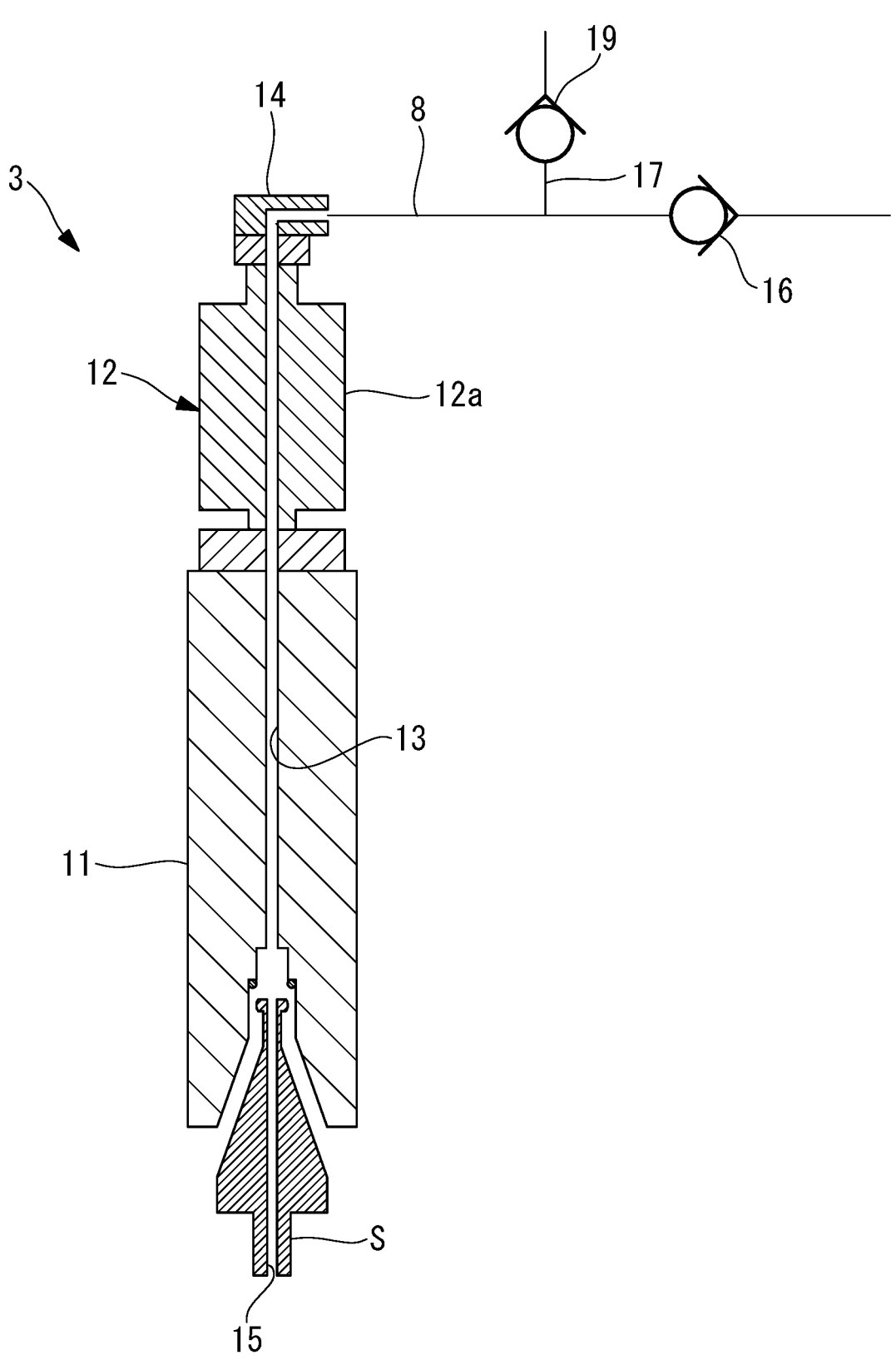
FIG. 2 is a vertical sectional view illustrating flow passages provided in a spindle, a chuck, and a tool of the machine tool of FIG. 1.

As shown in FIG. 2, the spindle 3 includes a chuck 11 that includes a tool exchanging mechanism at its lower end, and a motor 12 that drives the chuck 11 to rotate around a vertical axis. The chuck 11 and a rotor 12a of the motor 12 each have a through-hole (flow passage) 13 provided at the centers thereof so as to extend therethrough in a vertical direction, and at an upper end of the through-hole 13 of the rotor 12a, the pipe 8 for supplying the coolant L to the through-hole 13 is connected through a rotary joint 14.

Figure 3:
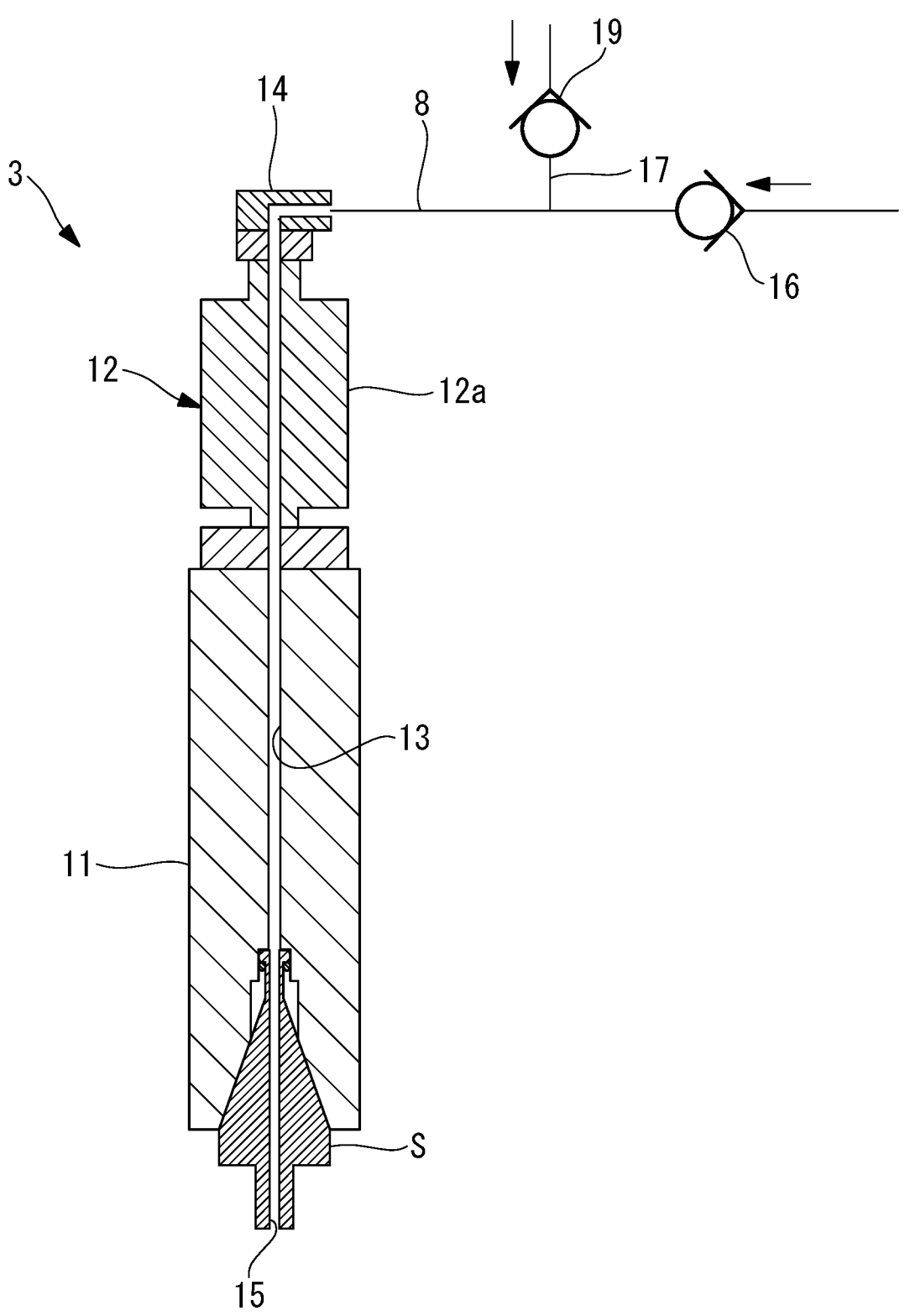
FIG. 3 is a vertical sectional view showing a state where the tool is mounted on the chuck of FIG. 2.

The tool S mounted on the chuck 11 also has a through-hole (flow passage) 15 provided so as to extend through the tool S from a leading end to a base end thereof along a central axis. As shown in FIG. 3, when the tool S is mounted on the chuck 11, the through-hole 15 of the tool S and the through-hole 13 of the chuck 11 are connected to each other. Thus, the coolant L having been supplied via the pipe 8 is discharged from the leading end of the tool S via the through-hole 13 of the chuck 11 and the through-hole 15 of the tool S.

Figure 4:
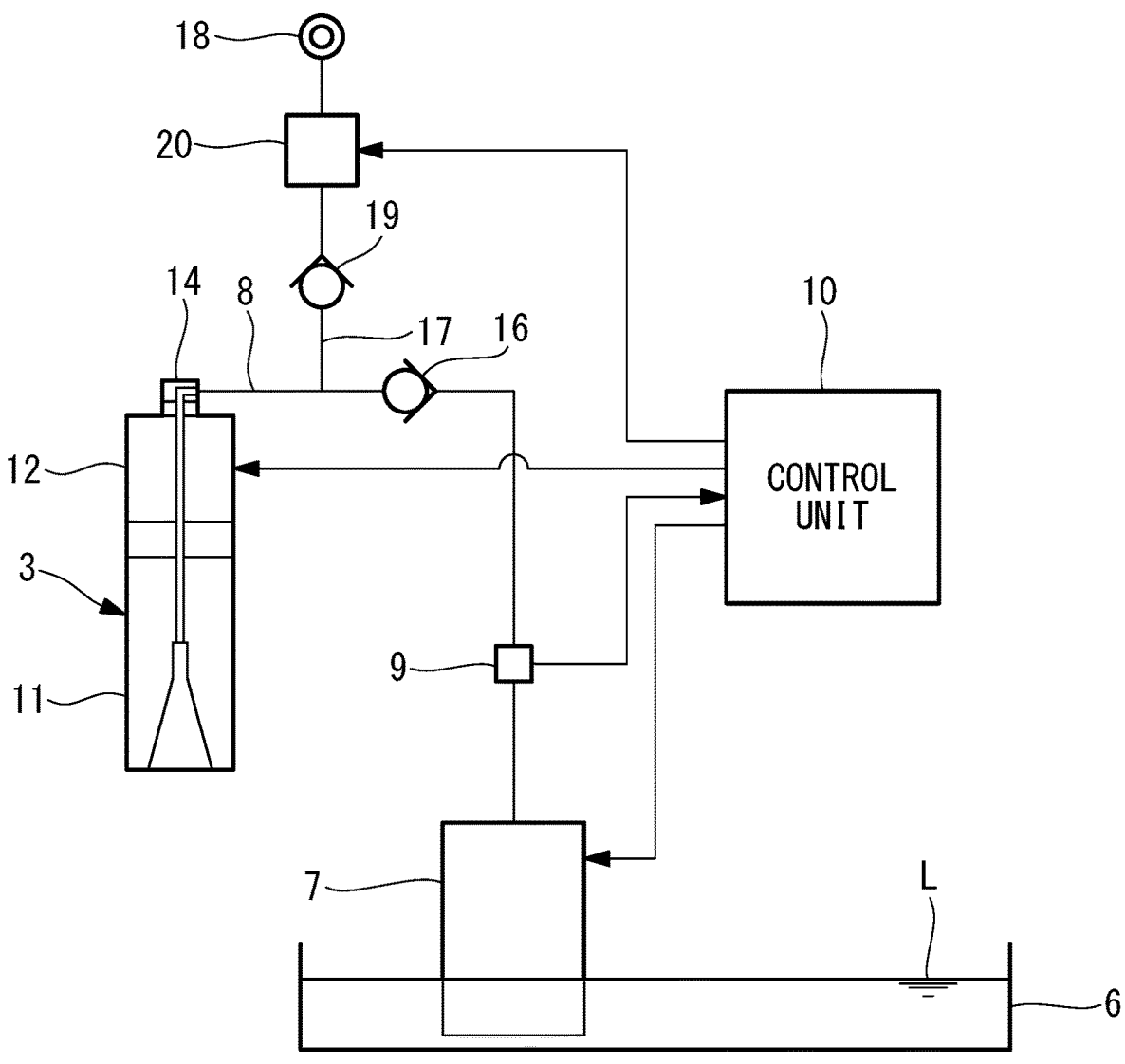
FIG. 4 is a block diagram schematically showing the machine tool of FIG. 1.

As shown in FIG. 4, a first check valve 16 that allows a flow of the coolant L from the pump 7 toward the rotary joint 14 and prohibits a backward flow thereof, and an air supply passage (cutting fluid removal unit) 17, which supplies pressurized air to a position between the first check valve 16 and the rotary joint 14, is provided in the pipe 8. A second check valve 19 that allows a flow of the pressurized air from an air pressure source (cutting fluid removal unit) 18 into the pipe 8 and prohibits a backward flow thereof to the air supply passage 17, and a solenoid valve 20 that switches between supplying the pressurized air from the air pressure source 18 and stopping the supply are provided in the air supply passage 17.

The pump 7 is a centrifugal pump in which the rotation rate can be controlled.

The control unit 10 includes at least one processor and a memory. The memory stores a first rotation rate of the pump 7 at the start of supply of the coolant L and a second rotation rate of the pump 7 during the subsequent steady operation. The first rotation rate is set to a value sufficiently higher than the second rotation rate, for example, twice as high.

Figure 5:
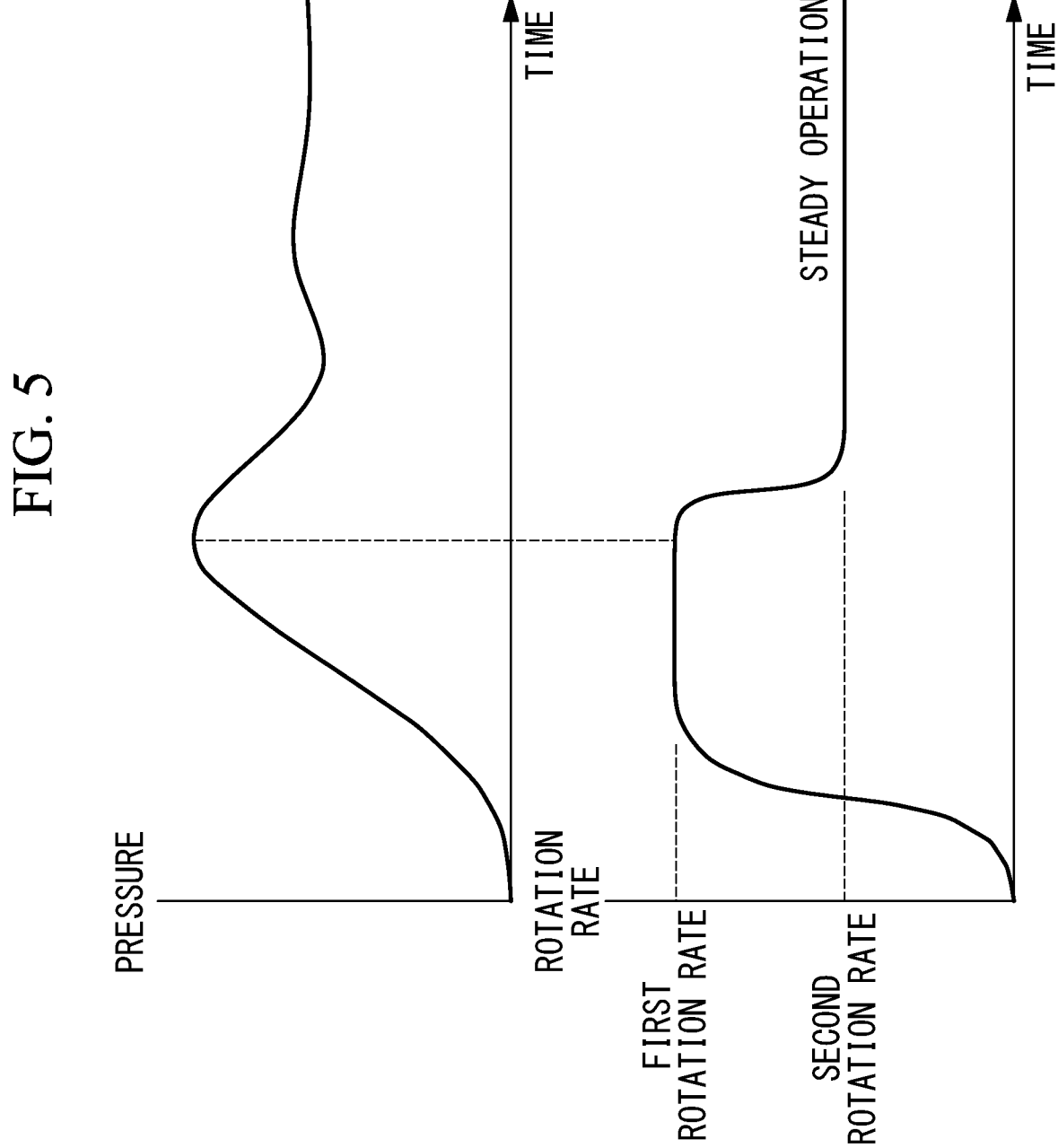
FIG. 5 is a graph illustrating a relationship between a pressure value detected by a pressure sensor included in the machine tool of FIG. 1 and a rotation rate of a pump.

In response to a command to start processing in accordance with a program that is taught beforehand, the control unit 10 rotates the pump 7 at the first rotation rate and monitors pressure values detected by the pressure sensor 9 at a predetermined sampling time interval. As shown in FIG. 5, at a point in time when the pressure reaches a peak value, the control unit 10 switches the rotation rate of the pump 7 to the second rotation rate and starts processing of a workpiece. Thus, the workpiece can be processed by the tool S while the coolant L is discharged from the leading end of the tool S.

In response to a command to exchange the tool S, the control unit 10 controls the solenoid valve 20 so as to supply the pressurized air from the air supply passage 17 into the pipe 8. Thus, the pressurized air is supplied to the flow passages 8, 13, 15 from the first check valve 16 to the leading end of the tool S, and the coolant L remaining inside the flow passages 8, 13, 15 can be thereby discharged from the leading end of the tool S.

After the coolant L is discharged, the control unit 10 activates the turret 5 to exchange the tool S.

Thus, the machine tool 1 according to this embodiment removes the coolant L remaining from the pipe 8 through the through-hole 13 inside the spindle 3 and the through-hole 15 of the tool S before exchange of the tool S. Thus, the coolant L can be prevented from adhering to a grasping surface of the chuck 11 from which the tool S has been removed or an outer surface of a taper shank etc. of the tool S having been removed from the chuck 11.

Preventing the coolant L from adhering to the grasping surface of the chuck 11 or the outer surface of the tool S can in turn prevent a decrease in the frictional force when the tool S is mounted on the chuck 11 and thereby prevent the tool S from slipping on the chuck 11. Moreover, problems caused by chips mixed in the coolant L, such as a situation where the tool S fails to be correctly mounted to the chuck 11 or where the grasping surface of the chuck 11 or the outer surface of the tool S becomes damaged, can be prevented. Further, rust formation or abnormal wear due to adhesion of the coolant L can be reduced.

When attaching a new tool S to the chuck 11, the coolant L is not remaining inside the through-holes 13, 15 of the spindle 3. Therefore, the tool S can be more reliably attached without causing the aforementioned problems.

As the coolant L is not present inside the flow passages 8, 13, 15 from the first check valve 16 to the leading end of the tool S at the point in time when the new tool S is attached to the chuck 11, processing cannot be started immediately.

According to this embodiment, upon a command to start processing, the pump 7 is operated at the first rotation rate higher than the second rotation rate for steady operation, so that the empty flow passages 8, 13, 15 can be quickly filled with the coolant L and the coolant L can be discharged from the leading end of the tool S to start processing. After the coolant L is discharged from the leading end of the tool S, the pump 7 is operated at the second rotation rate for steady operation that is lower than the first rotation rate. Thus, power consumption can be reduced, and the pressure of the coolant L can be lowered to relieve the load on each part.

In this case, according to this embodiment, the first rotation rate is switched to the second rotation rate at a point in time when it is determined that the coolant L has been discharged from the leading end of the tool S based on a detection result of the pressure sensor 9. Thus, even when the supply conditions of the cutting fluid vary, such as when the tool S is changed or the type of the coolant L is changed or the temperature of the coolant L changes, the pump 7 can be driven at the high first rotation rate until the coolant L is discharged from the leading end of the tool S.

As a result, advantages are offered in that the need for the task of setting the supply conditions of the coolant L for each tool S is eliminated, and in that, even when the supply conditions vary, the coolant L can be quickly discharged from the leading end of the tool S to quickly start processing by the tool S. Another advantage is that, after the coolant L is discharged from the leading end of the tool S, power consumption can be reduced and the load on each part can be reduced by lowering the rotation rate of the pump 7 and performing steady operation at the second rotation rate.

Figure 6:
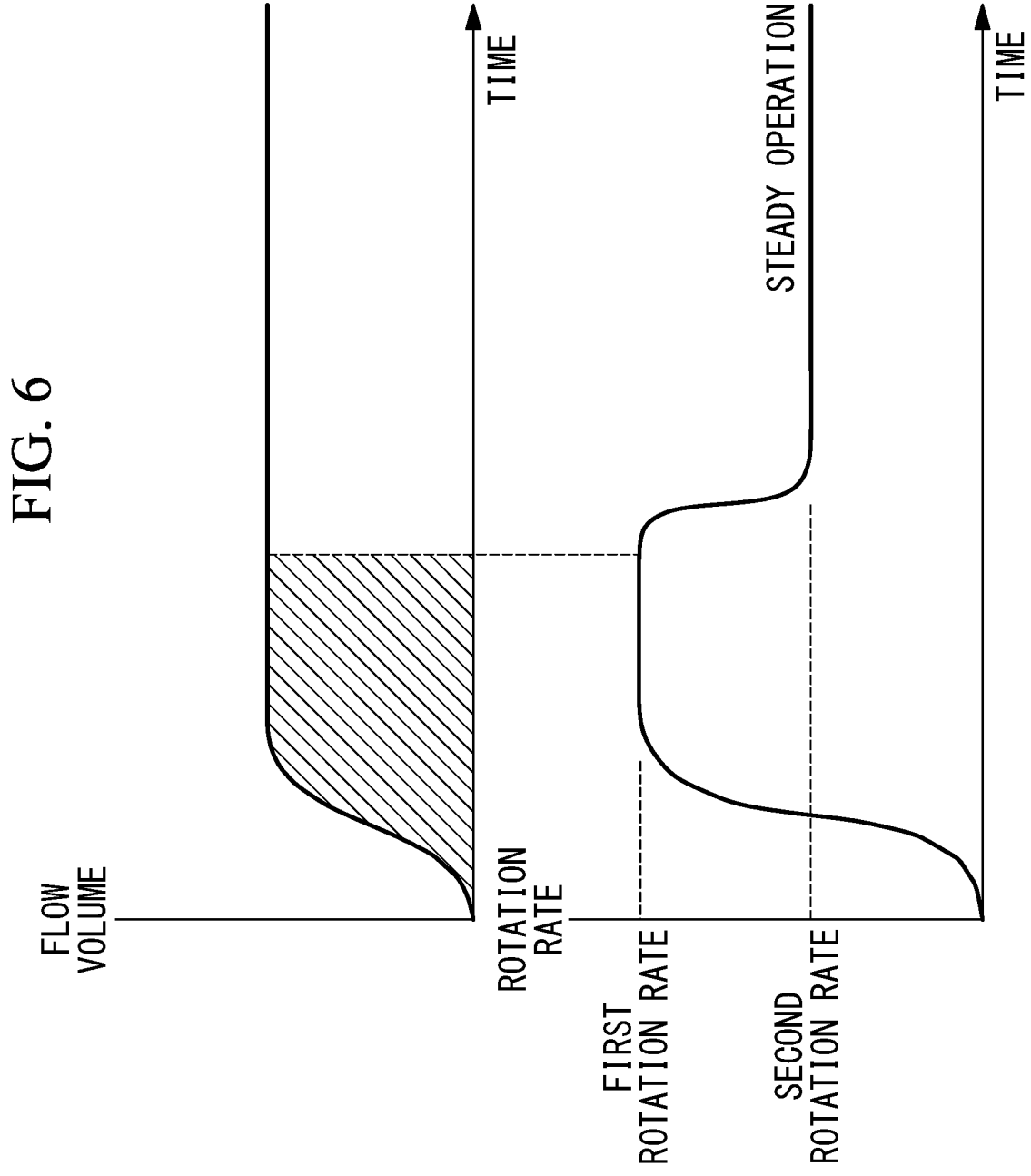
FIG. 6 is a modified example of FIG. 5 and is a graph illustrating a relationship between a flow volume value detected by a flow sensor and the rotation rate of the pump in a case where the flow sensor is installed in place of the pressure sensor.

In the machine tool 1 according to this embodiment, the pressure sensor 9 that detects the pressure inside the flow passages 8, 13, 15 from the pump 7 to the leading end of the tool S is adopted as the detection unit. The pressure sensor 9 may be disposed at an arbitrary position inside the flow passages 8, 13, 15. Instead of the pressure sensor 9, a flow sensor may be installed in the flow passage near a discharge port of the pump 7. When using a flow sensor, as shown in FIG. 6, the control unit 10 can add up flow volume values that are successively sent from the flow sensor (the hatched part in the graph). The control unit 10 can switch the first rotation rate to the second rotation rate at a point in time when the difference between the added-up value of flow volume values and the capacity of the flow passages 8, 13, 15 from the discharge port of the pump 7 to the leading end of the tool S has become equal to or smaller than a predetermined threshold value. Alternatively, without using a flow sensor, the control unit 10 may estimate the flow volume from a rotation rate and a current value of the motor.

In this embodiment, a centrifugal pump of which the rotation rate can be controlled is adopted as the pump 7. Instead, a fixed-displacement pump of which the rotation rate can be controlled may be adopted.

In this embodiment, pressurized air is supplied from the air supply passage 17 as the cutting fluid removal unit to the flow passages 8, 13, 15 to discharge the coolant L inside the flow passages 8, 13, 15. Instead of the air pressure source 18, a suction pump may be adopted and the coolant L inside the flow passages 8, 13, 15 may be removed by suctioning.

The invention claimed is:

1. A machine tool comprising:
   a cutting fluid supply unit configured to supply a cutting fluid to be discharged from a leading end of a tool mounted on a spindle;
   a detection unit configured to detect information for determining arrival of the cutting fluid to the leading end of the tool; and
   a control unit configured to determine the arrival of the cutting fluid based on the information detected by the detection unit and control the cutting fluid supply unit,
   wherein the control unit is configured to set a supply speed of the cutting fluid after the cutting fluid supply unit starts to supply the cutting fluid until determination of the arrival of the cutting fluid to be higher than a supply speed after the determination, wherein the detection unit is configured to detect a pressure inside a flow passage connecting the cutting fluid supply unit and the leading end of the tool to each other, and wherein the control unit is configured to determine that the cutting fluid has arrived at the leading end of the tool based on the pressure detected by the detection unit.

2. A machine tool, comprising:

a cutting fluid supply unit configured to supply a cutting fluid to be discharged from a leading end of a tool mounted on a spindle;

a detection unit configured to detect information for determining arrival of the cutting fluid to the leading end of the tool; and a control unit configured to determine the arrival of the cutting fluid based on the information detected by the detection unit and control the cutting fluid supply unit, wherein the control unit is configured to set a supply speed of the cutting fluid after the cutting fluid supply unit starts to supply the cutting fluid until determination of the arrival of the cutting fluid to be higher than a supply speed after the determination, wherein the detection unit is configured to detect a flow volume from a time when the cutting fluid supply unit starts to supply the cutting fluid, and wherein the control unit is configured to determine that the cutting fluid has arrived at the leading end of the tool at a point in time when a difference between an added-up value of flow volumes detected by the detection unit and a capacity of the flow passage connecting the cutting fluid supply unit and the leading end of the tool to each other becomes equal to or smaller than a predetermined threshold value.

3. A machine tool comprising:

a cutting fluid supply unit configured to supply a cutting fluid to be discharged from a leading end of a tool mounted on a spindle;

a detection unit configured to detect information for determining arrival of the cutting fluid to the leading end of the tool;

a control unit configured to determine the arrival of the cutting fluid based on the information detected by the detection unit and control the cutting fluid supply unit; and a cutting fluid removal unit configured to remove the cutting fluid inside a flow passage connecting the cutting fluid supply unit and the leading end of the tool to each other before exchange of the tool;

wherein the control unit is configured to set a supply speed of the cutting fluid after the cutting fluid supply unit starts to supply the cutting fluid until determination of the arrival of the cutting fluid to be higher than a supply speed after the determination.

* * * * *